United States Patent
Myono (10) Patent No.: US 6,400,210 B2
(45) Date of Patent: Jun. 4, 2002

(54) CHARGE-PUMP CIRCUIT FOR BOOSTING VOLTAGE STEPWISE

(75) Inventor: Takao Myono, Saitama (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 09/732,944

(22) Filed: Dec. 8, 2000

(30) Foreign Application Priority Data

Dec. 8, 1999 (JP) ............................................. 11-348474
Dec. 8, 1999 (JP) ............................................. 11-348475

(51) Int. Cl.$^7$ ................................................. G05F 3/02
(52) U.S. Cl. ........................................ 327/536; 327/537
(58) Field of Search ................................. 327/534, 536, 327/537

(56) References Cited

U.S. PATENT DOCUMENTS

| | | | |
|---|---|---|---|
| 5,008,799 A | * 4/1991 | Montalvo | 363/60 |
| 5,029,063 A | * 7/1991 | Lingstaedt et al. | 327/536 |
| 5,059,815 A | * 10/1991 | Bill et al. | 327/536 |
| 5,574,634 A | * 11/1996 | Parlour et al. | 363/59 |
| 6,028,473 A | * 2/2000 | Kamei et al | 327/536 |

* cited by examiner

Primary Examiner—Terry D. Cunningham
(74) Attorney, Agent, or Firm—Fish & Richardson P.C.

(57) ABSTRACT

A charge-pump circuit comprising diodes D1 and D2, which are connected in series; capacitors C1A and C1B, which are connected to the juncture of the diodes D1 and D2; a clock driver 11, for supplying a clock to the capacitor C1B; and switches S1, S2 and S3, which are used to connect the capacitors C1A and C1B to the juncture of the diodes D1 and D2 in series or in parallel, consonant with the voltage level of the clock, wherein a boosted voltage is output by the diode D2.

10 Claims, 8 Drawing Sheets

0.5-STEP CHARGE PUMP CIRCUIT

FIG. 3

−0.5 Vdd BOOST CHARGE PUMP CIRCUIT

-0.5 STEP BOOST CHARGE PUMP CIRCUIT $VH_{n+1} = -(n-0.5)Vdd$
Or $= -nVdd$

FIG. 6B 1.25Vdd BOOST CHARGE PUMP CIRCUIT

0.25 VDD STEP ± BOOST CHARGE PUMP CIRCUIT

FIG. 8

CONVENTIONAL ART

FIG. 9

CONVENTIONAL ART

CHARGE-PUMP CIRCUIT FOR BOOSTING VOLTAGE STEPWISE

BACKGROUND OF THE INVENTION

The present invention relates to a charge-pump circuit used for a power supply circuit, and relates in particular to a charge-pump circuit that can freely adjust a boosting voltage at a step whereat a voltage is smaller than a power voltage, and that can provide circuit efficiency that is greatly improved.

A charge-pump circuit developed by Digson is so designed that pumping packets are connected in series at multiple stages, and a voltage higher than the power source Vdd of an LSI chip is generated due to the fluctuation of the voltage in each pumping packet. This charge-pump circuit is used, for example, to generate a voltage for programming/erasing flash memories.

This example charge-pump circuit employs an output load current of several tens of $\mu A$. This low load current charge-pump circuit is effective because all the MOSFETs that serve as coupling capacitors or diodes can be incorporated in a single LSI. Recently, as the voltage used for flash memories has been lowered, a charge-pump circuit has been proposed that generates a high voltage and that provides improved boosting efficiency.

Aside from this, the portable devices, such as video cameras, digital cameras and portable telephones, that have recently become popular require high voltages and large currents (several mA) for liquid crystal displays, and for these devices, switching regulators are used as voltage generators.

In accordance with the principle on which a switching regulator is based, a large current flows to a coil while a counterelectromotive force raises the voltage precipitously. The switching regulator is characterized by its efficient production of a high voltage and a large current, and thus it is an appropriate means for providing the power efficiency (output power/input power) that is especially important for portable devices. However, when a large current flows across the coil, harmonic noise is generated, and shielding is required for the power supply circuit in order to prevent the harmonic noise from having an adverse affect. For a portable device, the generation of a high voltage with little attendant noise is desirable because of the reduced size of the unit and the increased sensitivity this entails.

When a voltage loss, such as the threshold value for a diode, is ignored, theoretically, at each stage the pumping packets of the charge-pump circuit receive a boost equivalent to the power voltage Vdd. So that when the input voltage Vin of the charge-pump circuit is defined as Vdd and the pumping packets that are arranged at n stages are connected in series to the power source circuit, the voltage can be boosted by $(n+1) \times (Vdd-Vt)$, wherein Vdd denotes the power voltage, and Vt denotes the threshold voltage of a diode in the forward direction. To simplify the following explanation, Vt=0V.

Figure 8:
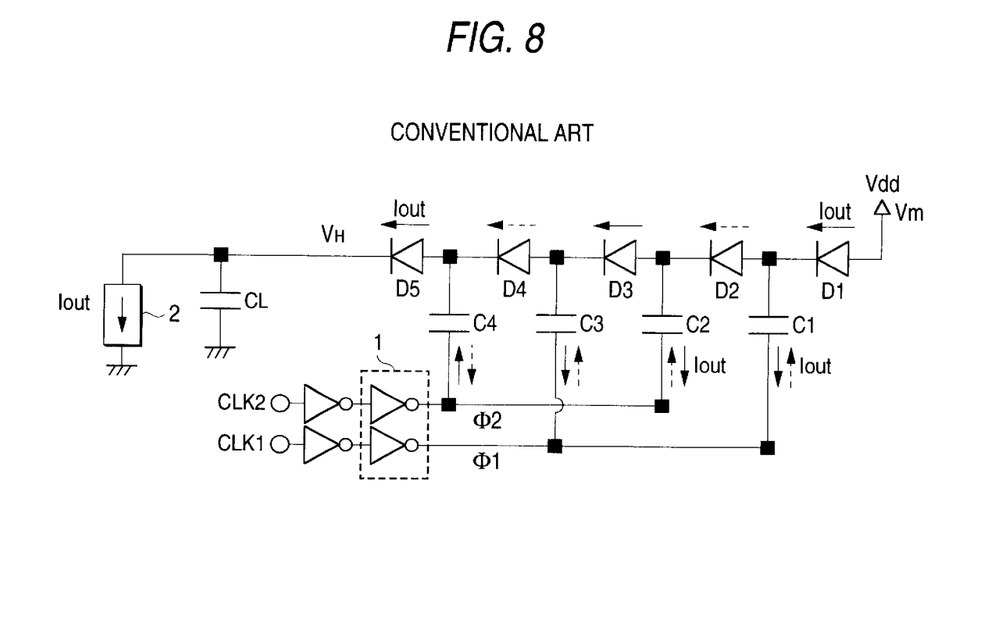
FIG. 8 is a schematic circuit diagram showing a conventional charge-pump circuit (n=4)

FIG. 8 is a schematic circuit diagram showing a conventional charge-pump circuit (n=4). In FIG. 8, diodes D1 to D5 are connected in series, and capacitors C1 to C4 are each connected at one end to a junction of two of the diodes D1 to D5 and at the other end to a clock driver 1 that supplies clocks $\Phi1$ and $\Phi2$, which have reverse phase clock pulses, to the capacitors C1 to C4. A current load 2 is driven by the boosting voltage VH and the output current $I_{out}$ that are output by the diode D5. And the charge-pump circuit has four pumping packets and corresponds to a charge-pump circuit having a four-stage arrangement.

The operation of this charge-pump circuit will now be described. When the clock $\Phi1$ at level L and the clock $\Phi2$ at level H are output by the clock driver 1, the current $2 \times I_{out}$ flows in the direction indicated by solid-line arrows and $I_{out}$ denotes the current output at the final stage by the diode D5.

Then, when the clock $\Phi1$=level H and the clock $\Phi2$=level the current $2 \times I_{out}$ flows in the direction indicated by broken-line arrows. Since these are alternately flowing currents, voltage boosting is performed at the individual stages, until at the final stage, a boosted voltage VH of 5 Vdd is output by the diode D5.

Supposing that the current output from the diode D5 at the final stage is $I_{out}$, on the average, the current input to the diode D1 at the first stage is equal to $I_{out}$ as are the currents flowing in the directions indicated by the solid-line arrows and the broken-line arrows. Therefore, when the efficiency $\eta$ of the charge-pump circuit is defined as $\eta$=output power/input power (%), the efficiency $\eta$ of the circuit is represented as follows.

$$\eta = 5 \; Vdd \times I_{out}/Vdd \times 5 \; I_{out} = 100\%$$

That is, under the operating conditions described above, the efficiency $\eta$ of the charge-pump circuit is 100%.

As is described above, the charge-pump circuit outputs the boosted voltage $(n+1) \times Vdd$, wherein n denotes the number of pumping steps in the charge-pump circuit and Vdd denotes a power voltage. Therefore, when Vdd=5V, the theoretical value VHn of the output voltage of a charge pump circuit having n steps is the step voltage for the Vdd step, i.e., when n=1, $VH_1$=2×Vdd=10V; when n=2, $VH_2$=3×Vdd=15V; and when n=3, $VH_3$=4×Vdd=20V.

Figure 9:
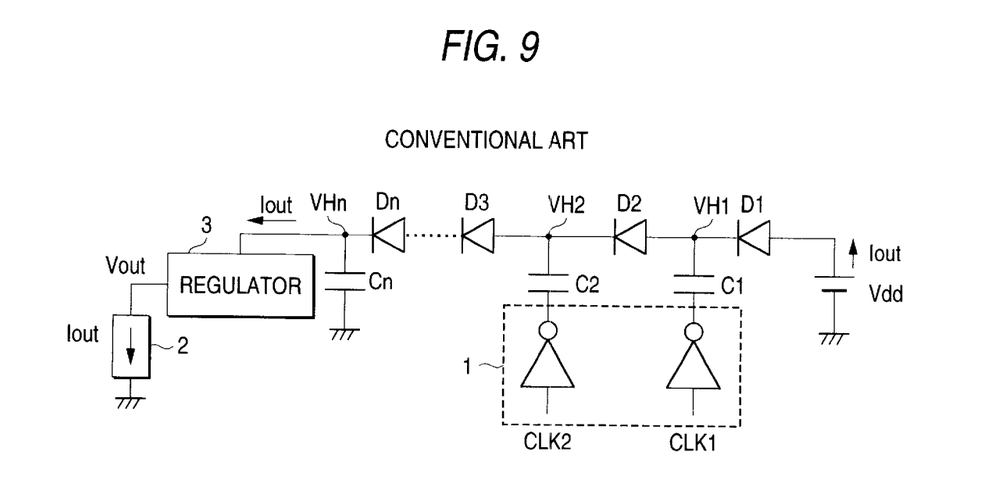
FIG. 9 is a schematic circuit diagram showing an n-step charge-pump circuit having a regulator.

When the charge-pump circuit is employed as a high voltage generator, a voltage may be adjusted by a regulator in order to set a desired high voltage. FIG. 9 is a schematic circuit diagram showing an n-step charge-pump circuit that includes a regulator. The same reference numerals as are used in FIG. 8 are used to denote corresponding or identical components in FIG. 9, and no further explanation for them will be given.

In FIG. 9, diodes D1 to Dn are connected in series. A boosted voltage VHn output at the final stage by the diode Dn is dropped by a regulator 3, and the obtained voltage is supplied to a current load 2. When the final output voltage obtained via the regulator 3 is defined as Vout and the output current is defined as Iout, the efficiency $\eta$ of the charge pump circuit is defined as $$\eta = \text{output power/input power} = Vout \times Iout/(n+1) \times Vdd \times Iout = Vout/(n+1)Vdd.$$

When the number n of charge pump steps is large, i.e., the voltage boosting ratio=VHn/Vdd is large, the charge-pump circuit can attain a substantially high efficiency. But when the power voltage fluctuation range is wide and Vout/Vdd is small, efficiency is deteriorated. Assume, then, that the number n of charge pump steps is variable and that Vdd=4 to 5.5V and Vout=6.5V. For this assumption, the step number n=1 is optimal, and for the charge-pump circuit, the efficiency ratios $\eta$ provided by Vdd=4V, 5V and 5.5V are as follows.

| Vdd = 4 V | n = 1 | VH = 8 V | $\eta$ = 81% |
| Vdd = 5 V | n = 1 | VH = 10 V | $\eta$ = 65% |
| Vdd = 5.5 V | n = 1 | VH = 11 V | $\eta$ = 59% |

As is apparent, an increase in the power voltage Vdd is accompanied by a deterioration in the efficiency ratio $\eta$. But when n=0.5, the following high efficiency ratios η can be provided.

| Vdd = 4 V | n = 1 | VH = 8 V | η = 81% |
| Vdd = 5 V | n = 0.5 | VH = 7.5 V | η = 86% |
| Vdd = 5.5 V | n = 0.5 | VH = 8.25 V | η = 79% |

This means that a charge-pump circuit can use 0.5 Vdd steps to boost voltage. However, conventional charge-pump circuits use Vdd steps to boost voltage, and up to the present no charge-pump circuit has been proposed that can use steps smaller than Vdd to boost voltage.

SUMMARY OF THE INVENTION

It is, therefore, one object of the present invention to provide a charge-pump circuit that can use a voltage step smaller than Vdd to boost voltage, and that can attain an improved circuit efficiency ratio η. Specifically, since the charge-pump circuit proposed by this inventor can theoretically provide output voltages of 1.5 Vdd, 2 Vdd, 2.5 Vdd, 3Vdd, . . . , it is another object of the present invention to expand this basic charge-pump circuit to boost voltages at smaller voltage steps, such as 1.5 Vdd, 1.75 Vdd, 2 Vdd, 2.25 Vdd, 2.5 Vdd, 2.75 Vdd, 3 Vdd, . . . , and it is an additional object of the present invention to boost voltages at arbitrary voltage steps, such as 1.33 Vdd, 1.66 Vdd, 2 Vdd, 2.33 Vdd, 2.66 Vdd and 3 Vdd, and to provide negative voltages as well. These and other objectives of the invention, as well as additional innovative features, will become obvious during the course of the description of the specification and when the accompanying drawings are referred to.

An overview of the aspects of the invention will now be described as follows. According to a first aspect of the invention, a charge-pump circuit comprises: a plurality of diodes connected in series; at least two capacitors connected to junctions of the diodes; clock supply means for supplying a clock to the capacitors; and switching means for connecting the capacitors in series to the junctions of the diodes and for connecting the capacitors in parallel to the junctions of the diodes in accordance with a voltage level of the clock, wherein a boosted voltage is output by the diodes.

This arrangement is the essential configuration of the invention, and it can provide a voltage boost while employing a voltage step that is smaller than a power voltage, while improving the efficiency ratio η of the circuit.

According to a second aspect of the invention, a charge-pump circuit comprises: a plurality of diodes connected in series; a power source for supplying a power voltage to a diode at a first stage; at least two capacitors connected to junctures of the diodes at the first stage and at a second stage; clock supply means for supplying a clock to the capacitors; and switching means for connecting the capacitors in series to the junctures of the diodes when the clock is at level L, and for connecting the capacitors in parallel to the junctures of the diodes when the clock is at level H, wherein a positive, boosted voltage is output by a diode at the final stage at a step whereat the voltage is smaller than the power voltage.

With this arrangement, a voltage can be boosted at a step whereat the positive voltage is smaller than the power voltage, and for the circuit, the efficiency ratio η can be improved.

According to a third aspect of the invention, a charge-pump circuit comprises: a plurality of diodes connected in series; a power source for supplying a power voltage to a diode at a first stage; at least two, first capacitors connected to junctures between the diodes at the first stage and at a second stage; at least one, second capacitor connected to junctures of the remaining diodes; clock supply means for alternately supplying clocks in reverse phases to the first capacitors and the second capacitor; and switching means for changing the connections of the first capacitors in accordance with the voltage level of the clock supplied to the first capacitors, wherein when the clock supplied to the first capacitors is at level L, the switching means connects the first capacitors in series to a juncture between diodes at a first stage and a second stage, wherein, when the clock supplied to the first capacitors is at level H, the switching means connects the first capacitors in parallel to the juncture, and wherein a diode at the final stage outputs a positive, boosted voltage obtained by adding a step whereat the voltage is the same as the power voltage to a step whereat the voltage smaller than the power voltage.

With this arrangement, a step whereat the voltage is smaller than the power voltage can be added to the step whereat the voltage is the same as the power voltage, and the thus obtained positive, boosted voltage can be output. Further, for the circuit, the efficiency ratio η can be improved.

According to a fourth aspect of the invention, the charge-pump circuit further comprises switch control means for controlling the switching means, so that, in response to a switch control signal output by the switch control means, the two or more capacitors are always connected in series to the juncture between the diodes at the first stage and the second stage, or are connected in series or in parallel in accordance with the level of the clock.

According to this arrangement, voltage boosting at the step whereat the voltage equals the power voltage, and voltage boosting at the step whereat the voltage is smaller than the power voltage can be implemented by a single charge-pump circuit. Further, the boosted voltage can be set more accurately, and for the circuit, the efficiency ratio η can be improved.

According to a fifth aspect of the invention, the charge-pump circuit of further comprises: a regulator for adjusting a boosted voltage output by the diode at the final stage.

According to a sixth aspect of the invention, the charge-pump further comprises: voltage detection means for detecting the boosted voltage output by the diode at the final stage; and charge-pump circuit step count control means for controlling the number of steps in the charge-pump circuit in accordance with the detection results that are obtained.

With this arrangement, the number of steps in the charge-pump circuit can be changed in accordance with the boosted voltage, and for the circuit, the efficiency ratio η can be further improved by adjusting the boosted voltage.

According to a seventh aspect of the invention, in the charge-pump circuit, the diodes are constituted by a MOS transistor wherein a gate and a source are connected in common. With this arrangement, diodes need not be separately formed during the MOS processing, and thus are easily manufactured.

According to an eighth aspect of the invention, in the charge-pump circuit, the switching means is constituted by a MOS transistor. According to this arrangement, since only a small number of circuit devices are required the structure is simple.

According to a ninth aspect of the invention, a charge-pump circuit comprises: a plurality of diodes being connected in series, with a ground voltage being applied to a diode at a first stage; at least two capacitors connected to junctures of said diodes at said first stage and at a second stage; clock driver means for supplying a clock to said capacitors; and switching means for connecting said capacitors in series to said junctures of said diodes when said clock is at level H, and for connecting said capacitors in parallel to said junctures of said diodes when said clock is at level L, wherein a negative, boosted voltage is output by a diode at the final stage at a step whereat the voltage is smaller than a power voltage supplied to said clock driver means.

Furthermore, according to the tenth aspect of the invention, a charge-pump circuit comprises: a plurality of diodes being connected in series, with a ground voltage being applied to a diode at a first stage; at least two, first capacitors connected to junctures between said diodes at said first stage and at a second stage; at least one, second capacitor connected to junctures of the remaining diodes; clock supply means for alternately supplying clocks in reverse phases to said first capacitors and said second capacitor; and switching means for changing the connections of said first capacitors in accordance with the voltage level of said clock supplied to said first capacitors, wherein a negative, boosted voltage is output by a diode at the final stage at a step whereat the voltage is smaller than a power voltage supplied to said clock driver means.

DETAILED DESCRIPTION OF THE PREFERRED EMBODIMENTS

Figure 1A:
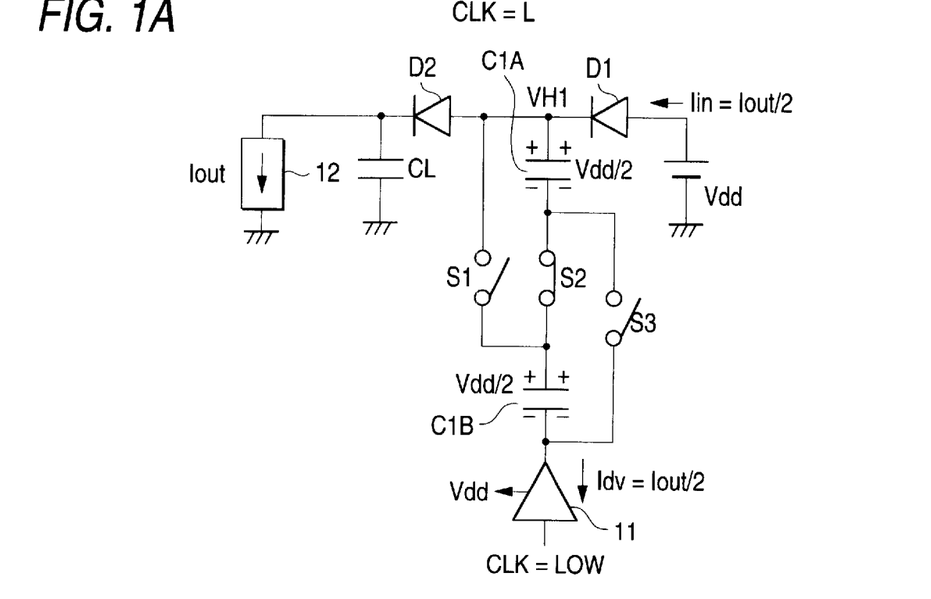
FIGS. 1A and 1B are schematic circuit diagrams showing a charge-pump circuit according to a first embodiment of the invention.
Figure 1B:
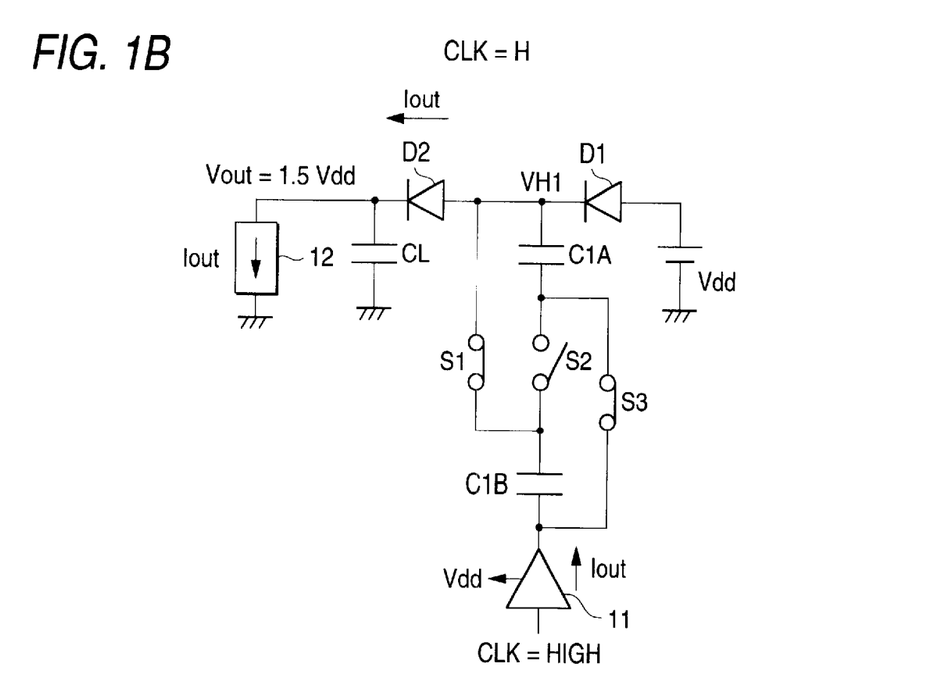

First to sixth embodiments of the invention will now be described while referring to FIGS. 1 to 7. FIGS. 1A and 1B are schematic diagrams showing a charge-pump circuit according to the first embodiment.

In FIGS. 1A and 1B, diodes D1 and D2 are connected in series, and a power voltage Vdd is supplied to the node of the diode D1. The diodes D1 and D2 can be constituted by a MOS transistor having a gate and a drain that are connected in common. Switches S1, S2 and S3 are used to connect capacitors C1A and C1B in parallel or in series to a juncture of the diodes D1 and D2.

The switches S1, S2 and S3 can be constituted by a MOS transistor. A clock driver 11, which supplies a clock to the capacitor C1B, is constituted by connecting two CMOS inverters in series. A load 12 receives a boosted voltage VH from the diode D2, and the output node of the diode D2 has a capacitance CL.

The operation of the charge-pump circuit will now be described. As is shown in FIG. 1A, When the input clock of the clock driver 11 is at level L (CLK=Low), and S1=off, S2=on and S3=off, the capacitors C1A and C1B are connected in series to the juncture of the diodes D1 and D2. Then, a Vdd/2 charge is placed on the capacitors C1A and C1B. At this time, when a current flowing from the source of the power voltage Vdd to the capacitors C1A and C1B is defined as Iin, the same current Idv=Idv flows in the clock driver 11.

Next, as is shown in FIG. 1B, when the input clock of the clock driver 11 is at level H (CLK=High), and S1=on, S2=off and S3=on, the capacitors C1A and C1B are connected in series to the juncture between the diodes D1 and D2. Since the voltage used to charge the capacitors C1A and C1B is Vdd/2, when the output of the clock driver 11 is defined as Vdd, the voltage VH1 at the juncture of the diodes D1 and D2 is boosted to 1.5 Vdd. Further, the current flowing from the capacitors C1A and C1b to the diode D2 at the succeeding stage is 2×Iin, and the same current Idv=2× Iin flows from the clock driver 11.

Assuming that a current Iout output by the diode d2 is defined as a constant, and that all the currents are time average currents, during normal operation these currents are as follows:

$$Iin = Iout/2$$

Vout=1.5 Vdd (the power voltage of the driver is defined as Vdd)

Idv=Iout/2 (current flowing into the clock driver 11)

Idv=Iout (current flowing from the power voltage Vdd source of the clock driver 11)

where Vout denotes a voltage output by the diode D2, and for simplification of the explanation, the threshold voltage for both the diode D1 and the diode D2 is defined as 0V.

As the main point of the charge-pump circuit in this embodiment, in accordance with the level of the clock CLK, the connection in series and the charging of the capacitors C1A and C1B, and the connection in parallel and the discharging of the capacitors C1A and C1B is repeated to boost the voltage at the step whereat the voltage is Vdd/2. Further, the important point is that, when CLK=L, the current Iin input by the power voltage Vdd source is ½ of the output current Iout. Therefore, when regulation of the output voltage is not performed the theoretical efficiency ratio η of the circuit can reach 100%, and no power loss will be incurred due to the boosted voltage of 1.5 Vdd.

Specifically, since the input current is the sum of the current Iout when CLK=H and the current Iout/2 when CLK=L, $$\eta = \text{output power/input power}$$
$$= (1 + 0.5) \, Vout \times Iout / Vout \times 1.5 \, Iout$$
$$= 100\%$$

Substantially, this can comprise a 0.5-step charge-pump circuit. Further, the theoretical efficiency ratio η of the circuit can reach 100%. Other methods can be employed to generate a voltage of 0.5 Vdd, such as a method for which resistance division is used; however, with this method, the efficiency ratio η of the circuit can not reach 100%. That is, a power loss must be arisen. On the other hand, according to the present invention, an accompanying power loss can theoretically each 0%, because the parallel and series connections of the capacitors are alternately switched consonant with the level of the clock CLK.

When the two capacitors C1A and C1B connected in series are operated without regard for the state of the clock CLK (S1=off, S2=on and S3=off), the charge-pump circuit works the same as a conventional charge pump, and Vout=2 Vdd. In this case, when a switching controller (not shown) is provided that supplies a switch control signal to the switches S1, S2 and S3, a constant, in line series connection can be selected for the two capacitors C1A and C1B, or they can be connected in series or in parallel consonant with the voltage level of the clock CLK.

That is, the charge-pump circuit in this embodiment can obtain an output voltage Vout of 1.5 Vdd or 2 Vdd, since either a 0.5 step or 1 step can be selected.

When the 0.5-step charge-pump circuit is generalized, an output voltage Vout of Vdd+Vdd/m can be obtained by changing the connections of m capacitors so they are connected in series or in parallel.

Figure 2:
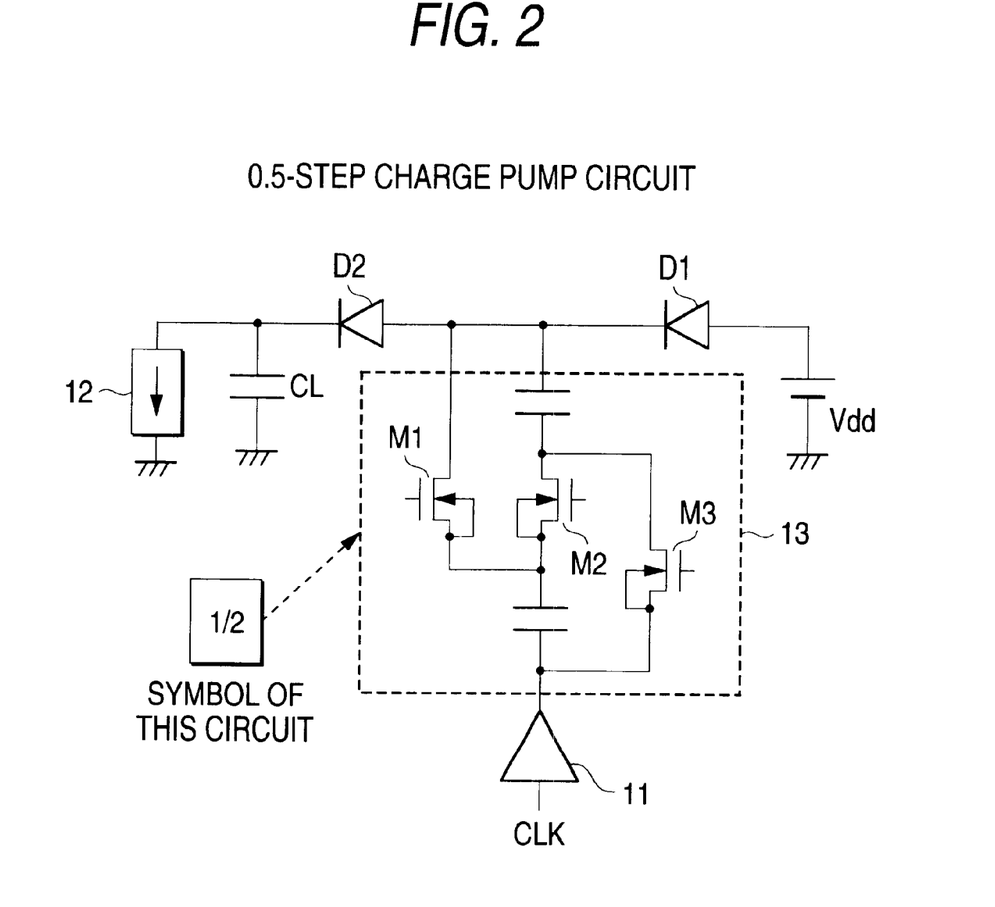
FIG. 2 is a schematic circuit diagram showing a 0.5-step charge-pump circuit wherein switches S1 to S3 are replaced with MOSFETs (MOS transistors)

FIG. 2 is a diagram showing a 0.5-step charge-pump circuit wherein the switches S1 to S3 have been replaced with MOSFETs (MOS transistors). The MOS transistors M1, M2 and M3 correspond to the switches S1, S2 and S3. A block enclosed by a broken line denotes a series-parallel capacitor 13, and hereinafter, this series-parallel capacitor 13 will be indicated by using the symbol shown in FIG. 2.

Figure 3:
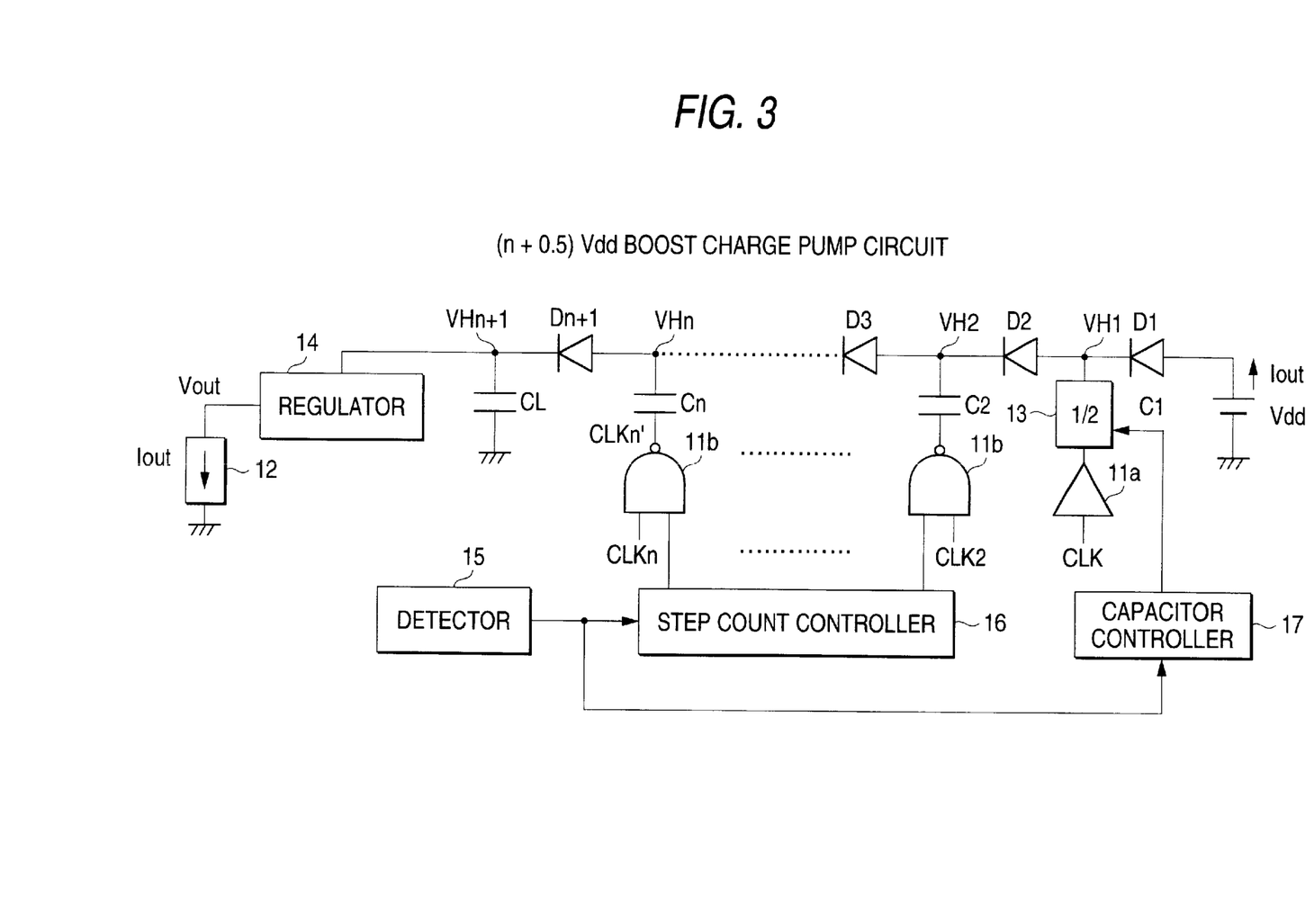
FIG. 3 is a schematic circuit diagram showing a charge-pump circuit according to a second embodiment of the invention.

FIG. 3 is a schematic circuit diagram showing a charge-pump circuit according to a second embodiment. The charge-pump circuit is a (n+0.5) Vdd boosting charge-pump circuit, and in accordance with the step count n, a boosted voltage of (n+0.5) Vdd or (n+1) Vdd is output.

In FIG. 3, diodes D1 to Dn+1 are connected in series, and a power voltage Vdd is applied to the anode of the diode D1. The diodes D1 to Dn+1 can be constituted by MOS transistors, for each of which the gate and the drain are connected in common. A series-parallel capacitor 13 is connected to the juncture of the diodes D1 and D2, and a clock CLK is supplied by a clock driver 11a.

Capacitors C2 to Cn are connected to the junctures between the respective diodes D2 to Dn+1, and clocks CLK2 to CLKn are supplied by a clock driver 11b. The phase of the clock CLK is the reverse of that of the clocks CLK2 to CLKn. A regulator 14 adjusts a boosted voltage VHn+1 output by the diode Dn+1, and the output Vout of the regulator 14 is applied to a load 12.

A detector 15 detects the boosted voltage VHn+1, and outputs the detection results to a charge-pump circuit step count controller 16. The detector 15 can be a differential amplifier for comparing the boosted voltage VHn+1 with a reference voltage Vref, and may output a voltage at level "H" when VHn+1>Vref, or a voltage at level "L" when VHn+1<Vref.

In accordance with the output of the detector 15, the charge-pump circuit step count controller 16 outputs a clock control signal to the clock driver 11b, which can be constituted by a NAND circuit. A series-parallel capacitor controller 17 then permits the serial-parallel capacitor 13 to either perform a 0.5 Vdd boosting or a Vdd boosting.

The charge-pump circuit step count controller 16 controls the number of steps in the charge-pump circuit in accordance with the output of the detector 15. Power is supplied by a battery, and as the charge on the battery is consumed, the power voltage Vdd drops. The change in the power voltage Vdd appears as a value VHn+1. When the power voltage Vdd is raised, the value VHn+1 is increased, and when the power voltage Vdd is dropped, the value VHn+1 is reduced. A desired voltage Vout obtained by the regulator 14 is Vout=VHn+1−Δv. At this time, Δv is a voltage that has been abandoned, and as Δv is minimized, the efficiency of the charge-pump circuit increases. When the power voltage Vdd is high, the number of steps in the charge-pump circuit is reduced, and when the power voltage Vdd is low, the number of steps is increased, so that the voltage Δv can be minimized. After a portable device has been powered on and the operation of the charge-pump circuit has been stabilized, the charge-pump step count controller 16 is activated and optimizes the number of steps in the charge-pump circuit. After being optimized, the number of steps remains unchanged until the portable device is powered off. That is, each time the portable device is powered on, the charge-pump step count controller 16 is activated.

Assume that clock CLKn' in FIG. 3 is fixed at level H and the MOSFET that serves as a diode is on continuously. This state is equivalent to one where the number of steps in the charge-pump circuit is decremented by one. When the step count is decremented by 0.5, as previously described, the capacitors of the pumping packet at the first state are operated while connected in series or in parallel. With this arrangement, the number of charge-pump steps can be substantially adjusted to n, n−0.5, n−1, n−1.5, n−2 . . . In other words, only the number of steps required to minimize the voltage Δv need be determined.

The (n+0.5) Vdd boosting charge-pump circuit in this embodiment is a combination of the 5-step or 1-step charge-pump circuit and the n-step charge-pump circuit in the first embodiment. The boosted voltage VHn+1 is either (n+0.5) Vdd or (n+1) Vdd. Further, since the detector 15 and the charge-pump circuit step count controller 16 are operated, a variable number of steps can be obtained for the n-step charge-pump circuit. Accordingly, a variable boosted voltage VHn+1 can be obtained. When the clock CLKn' is fixed at level H (the clock is halted) in consonance with the clock control signal generated by the charge-pump circuit step count controller 16, and when the MOS transistor corresponding to the diode Dn+1 is continuously in the ON state, the number of steps in the charge-pump circuit is n−1.

As is described above, the (n+0.5) Vdd boosting charge-pump circuit outputs a boosted voltage using a 0.5 Vdd step, such as 1.5 Vdd, 2 Vdd, 2.5 Vdd, 3 Vdd, and the regulator 14 adjusts the boosted voltage to a desired voltage and applies the desired voltage to the load 12.

Figure 4A:
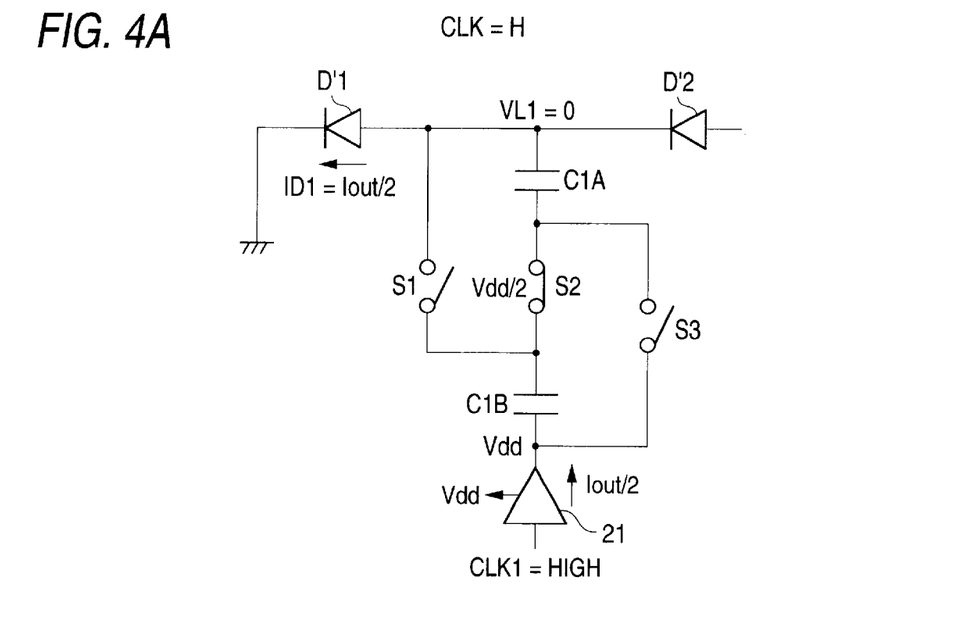
FIGS. 4A and 4B are schematic circuit diagrams showing a charge-pump circuit according to a third embodiment of the invention.
Figure 4B:
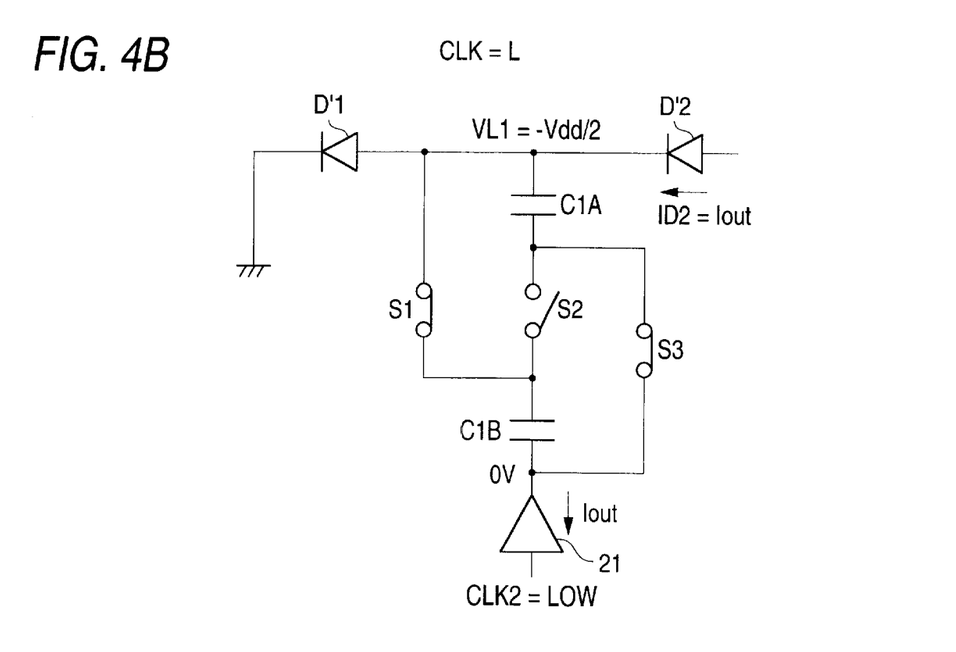

FIGS. 4A and 4B are schematic circuit diagrams showing a charge-pump circuit according to a third embodiment. The charge-pump circuit is a −0.5 Vdd boosting charge-pump circuit, which generates a voltage obtained by using −0.5 Vdd to boost the ground voltage.

In FIGS. 4A and 4B, diodes D'1 and D'2 are connected in series, and a ground voltage (0V) is applied to the cathode of the diode D'1. The diodes D'1 and D'2 can be constituted by MOS transistors, each of which have their gate and drain connected in common.

As equivalent to the circuit shown in FIG. 2, switches S1, S2 and S3, which can be constituted by MOS transistors, are used to connect capacitors C1A and C1B in parallel or in series to the juncture of the diodes D'1 and D'2. A clock driver 21, which can be constituted by a two-step CMOS inverter, supplies a clock to the capacitor C1B, and the voltage output by the diode D'2 is applied to a load (not shown).

The operating principle of the charge-pump circuit is the same as that in the first embodiment, and will now be briefly described.

Assuming that S1=off, S2=on and S3=off when the input clock of the clock driver 21 is at level H (CK1=High), the two capacitors C1A and C1B are connected in series, and the terminal voltages of the capacitors are 0V, Vdd/2 and Vdd, as shown in FIG. 4A. In other words, the voltage used to charge the capacitors C1A and C1B is Vdd/2.

Assuming that S1=on, S2=off and S3=on when the input clock of the clock driver 21 is at level L (CK2=Low), the two capacitors C1A and C1B are connected in parallel. And since the output voltage of the clock driver 21 drops from Vdd to 0V, the voltage VL1 of a pump node is VL1=Vdd/2−Vdd=−Vdd/2.

When a current flowing across a load is defined as a constant Iout and all currents are time-averaged currents, the currents encountered during a normal operation are as follows.

Current at the diode D'1: ID1=Iout/2

Current at the diode D'2: ID2=Iout

Current at the clock driver: Idv1=Iout/2 (CK1=High)

Current at the clock driver: Idv2=Iout (CK2=Low)

Vout=−1.5 Vdd (the power voltage at the clock driver is defined as Vdd)

The input power of the −0.5 Vdd boosting charge-pump circuit is power consumed by the clock driver 21. In addition, when CK1=H, the current ID1 at the diode D'1 is ½ of the output current ID2=Iout. Thus, without any regulation of the output being performed, the theoretical efficiency is 100%, and no loss due to Vout=−1.5 Vdd occurs. That is, as in the first embodiment, the efficiency ratio η of the circuit is 100%, as is shown by the following equation.

$$\eta = 1.5\ Vout \times Iout / Vout \times 1.5\ Iout = 100\%.$$

When the two capacitors C1A and C1B are connected in series and operated, regardless of the states of the clocks CK1 and CK2 (S1=off, S2=on and S3=off), the charge-pump circuit acts the same as a conventional charge pump, and Vout=−Vdd. In this case, a switch controller (not shown) is provided and supplies a switch control signal to the switches S1, S2 and S3, so that a constant connection can be selected whereby the two capacitors C1A and C1B are connected in series or a connection can be selected whereby they are connected in series or in parallel, consonant with the voltage levels of the clocks CK1 and CK2. That is, a 0.5 step or a 1 step can be selected, and the charge-pump circuit in this embodiment can obtain an output voltage Vout of −0.5 Vdd or −Vdd.

When a −0.5 Vdd charge-pump circuit is generalized, the output voltage Vout of −Vdd/m can be obtained by changing the connections of m capacitors so they are connected either in series or in parallel.

Figure 5:
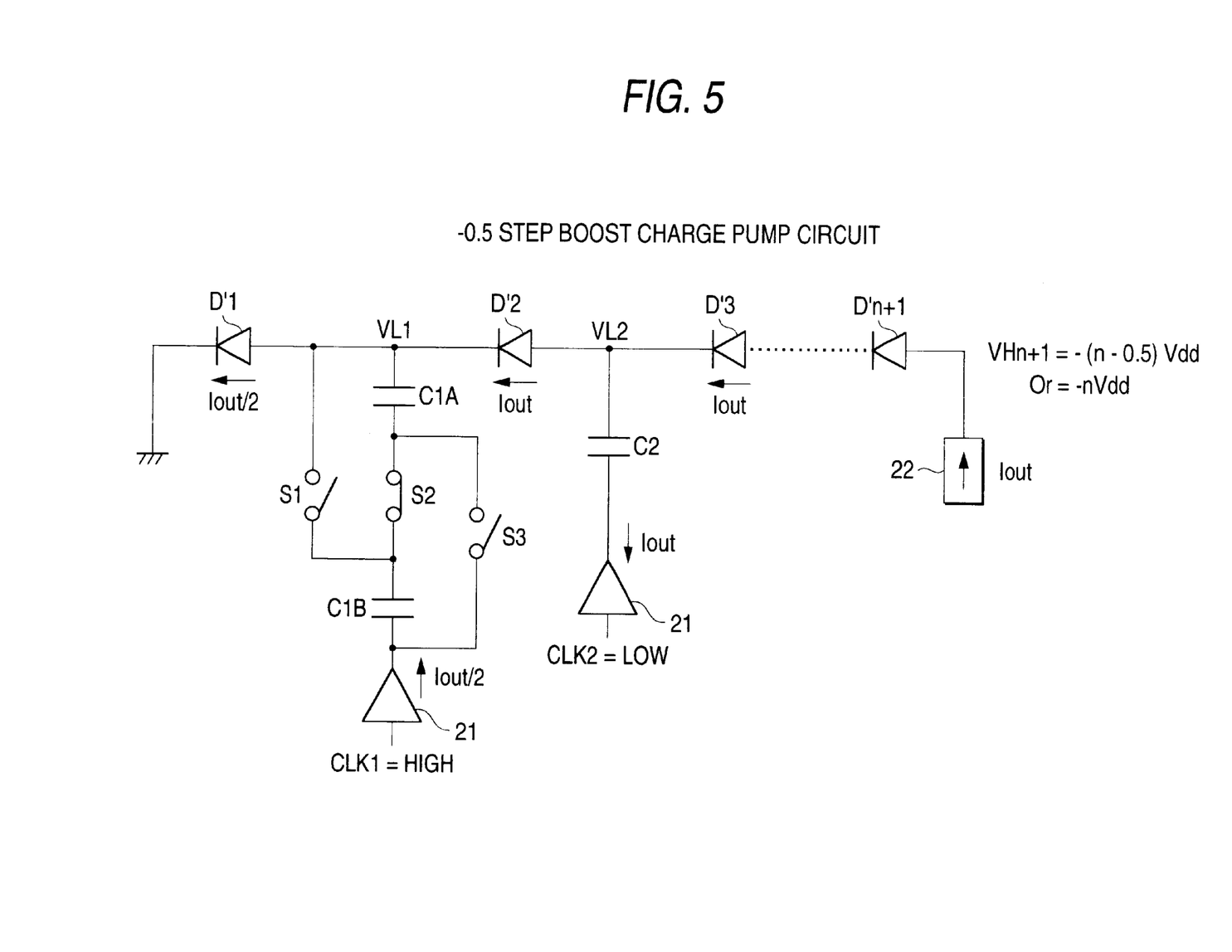
FIG. 5 is a schematic circuit diagram showing a charge-pump circuit according to a fourth embodiment of the invention.

FIG. 5 is a schematic circuit diagram showing a charge-pump circuit according to a fourth embodiment. This charge-pump circuit is a −0.5 Vdd step voltage boosting charge-pump circuit that outputs a boosted voltage of −(n−0.5) Vdd or −n Vdd.

In FIG. 5, the diodes D'1 to D'n+1 are connected in series, and a ground voltage (0 V) is supplied to the cathode of the diode D'1. The diodes D'1 to D'n+1 can be constituted by MOS transistors, each of which have their gate and drain connected in common.

The series-parallel capacitor used in the third embodiment is connected to the juncture of the diodes D'1 and D'2, and the clocks CK1 and CK2 are supplied by a clock driver 21.

Also in FIG. 5, although the input clock of the clock driver 21 is CK 1=High, the case wherein CK2=Low is also naturally included. Further, capacitors C2 to Cn are connected to the junctures of the respective diodes D'2 to D'n+1, and clocks CK2 to CKn are supplied to them by the clock driver 21, even though the capacitors C3 to Cn and another clock driver are not shown in FIG. 5. The phase of the clock CK1 is the reverse of that of the clocks CK2 to CKn, and a boosted voltage VHn+12 output by the diode D'n+1 is applied to a load 22.

The −0.5 Vdd step boosting charge-pump circuit in this embodiment is a combination of the 0.5 step or 1 step charge-pump circuit and the n-step charge-pump circuit in the third embodiment, and the boosted voltage VHn+1 is −(n−0.5) Vdd or −nVdd. Since as in the second embodiment the detector and the charge-pump circuit step count controller are provided, a variable number of steps can be acquired for the n-step charge-pump circuit. Accordingly, a variable boosted voltage VHn+1 can be obtained. And when the clock CLKn is halted and the MOS transistor corresponding to the diode D'n+1 is continuously in the ON state, the number of steps in the charge-pump circuit is n−1.

With this arrangement, to output the boosted voltage the −0.5 Vdd step boosting charge-pump circuit uses −0.5 Vdd steps, such as −0.5 Vdd, −Vdd, −1.5 Vdd, −2 Vdd, −2.5 Vdd, . . . Further, when a regulator (not shown) is provided at the output stage of the diode D'n+1, the regulator can adjust the boosted voltage VHn+1 to a desired voltage Vout and can apply the desired voltage Vout to the load 22.

Figure 6A:
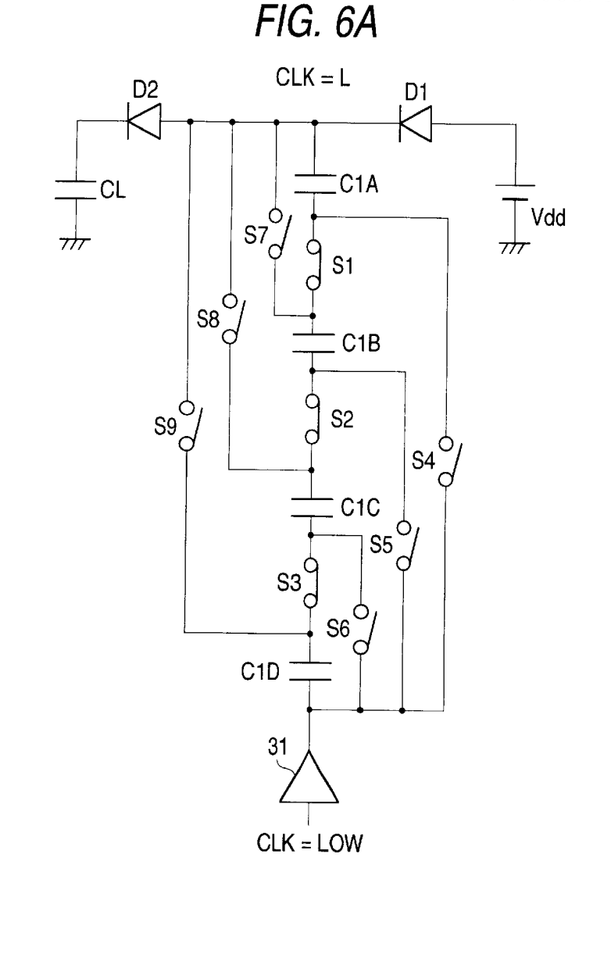
FIGS. 6A and 6B are schematic circuit diagrams showing a charge-pump circuit according to a fifth embodiment of the invention.
Figure 6B:
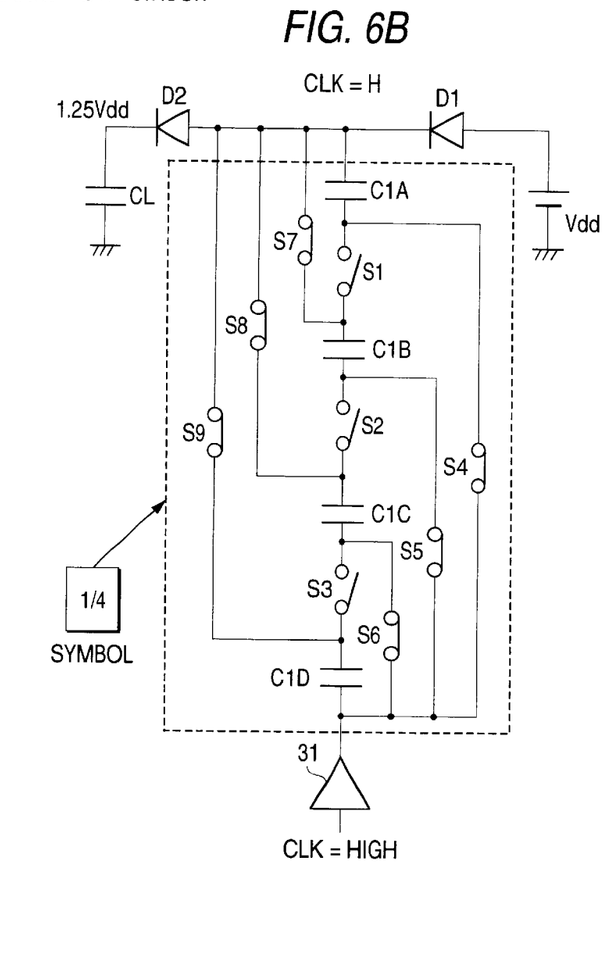

FIGS. 6A and 6B are schematic circuit diagrams showing a charge-pump circuit according to a fifth embodiment. This charge-pump circuit is a 1.25 Vdd boosting charge-pump circuit. In FIGS. 6A and 6B, diodes D1 and D2 are connected in series, and a power voltage Vdd is supplied to the anode of the diode D1. The diodes D1 and D2 can be constituted by MOS transistors, each of which has their gate and drain connected in common. Switches S1 to S9 are used to connect capacitors C1A, C1B, C1C and C1D in parallel or in series to the juncture between the diodes D1 and D2.

These switches S1 to S9 can be constituted by MOS transistors, while a clock driver 31, which supplies a clock to the capacitor C1D, can be constituted by a two-step CMOS inverter. The output voltage of the diode D2 is applied to a load (not shown).

The operation of the charge-pump circuit will now be described.

Assuming that, as is shown in FIG. 6A, S1 to S3=on and S4 to S9=off when the input clock of the clock driver 31 is at level L (CLK=Low), the four capacitors C1A to C1D are connected in series to the juncture of the diodes D1 and D2. And then, a charge of Vdd/4 is placed on the capacitors C1A to c1D.

Assuming that, as is shown in FIG. 6B, S1 to S3=off and S4 to S9=on when the input clock of the clock driver 31 is at level H (CLK=High), the four capacitors C1A to C1D are connected in parallel at the juncture of the diodes D1 and D2. Since the voltages on the capacitors C1A to C1D are Vdd/4, when the output of the clock driver 11 is defined as Vdd, the voltage at the juncture of the diodes D1 and D2 is boosted to 1.25 Vdd.

Figure 7:
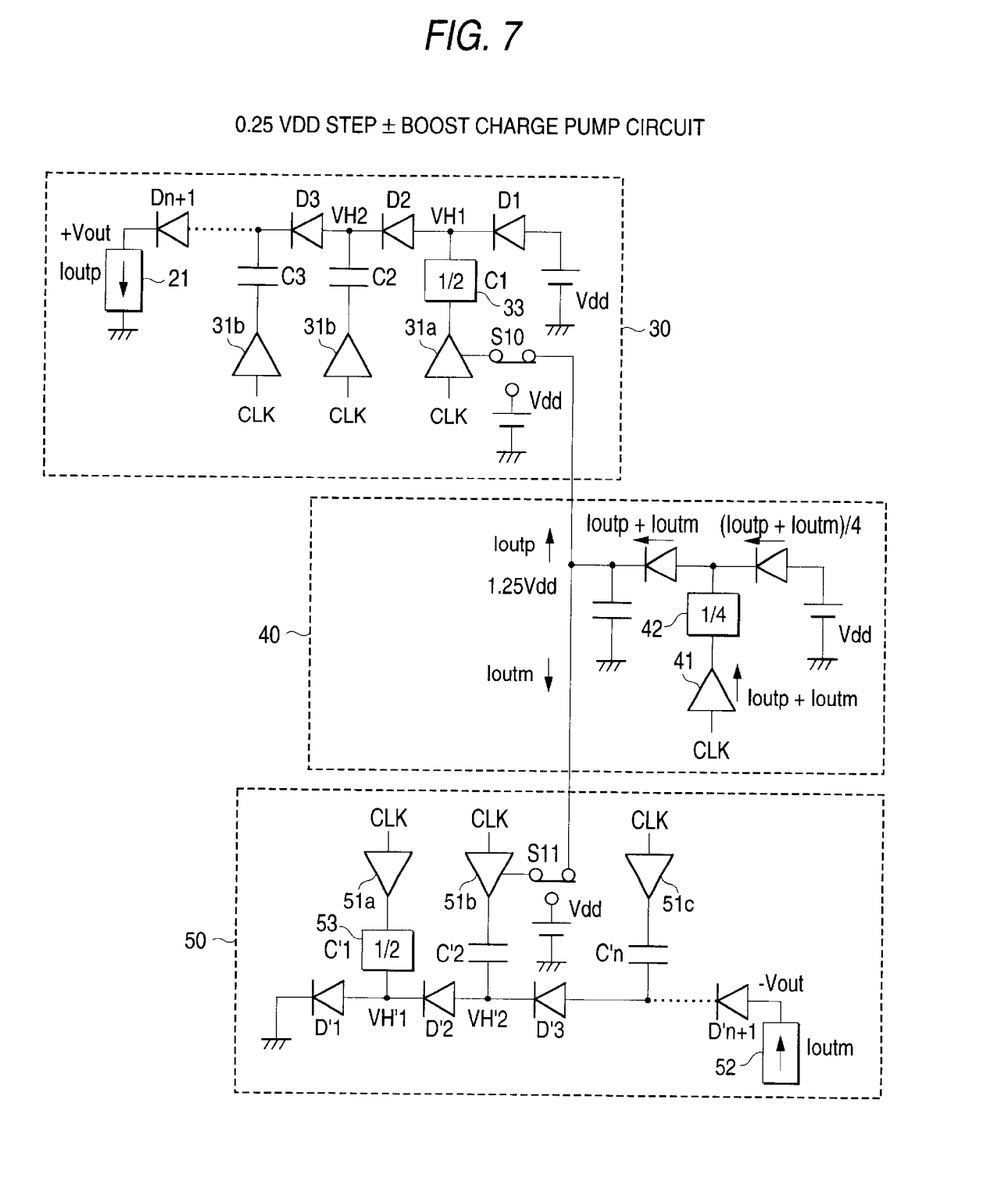
FIG. 7 is a schematic circuit diagram showing a charge-pump circuit according to a sixth embodiment of the invention.

FIG. 7 is a schematic circuit diagram showing a charge-pump circuit according to a sixth embodiment. This charge-pump circuit is a 0.25 Vdd step ± boosting charge-pump circuit. In FIG. 7, reference numeral 30 designates a +0.5 Vdd step boosting charge-pump circuit; reference numeral 50 designates a −0.5 Vdd step boosting charge-pump circuit; and reference numeral 40 designates a +1.25 Vdd step boosting charge-pump circuit, whose output voltage 1.25 vdd is supplied as the power voltage for a clock driver 31*b* or 51*b* consonant with the selection of the switch S10 or S11. The +1.25 Vdd step boosting charge-pump circuit 40 includes a clock driver 41 and four series-parallel capacitors 42, and outputs a voltage of 1.25 Vdd. Since the other arrangement is the same as that in the fifth embodiment, no additional detailed explanation will be given for it.

The +0.25 Vdd step boosting charge-pump circuit 30 outputs a boosted voltage using a 0.25 step, i.e., Vout=1.5 Vdd, 1.75 Vdd, 2 Vdd, 2.25 Vdd, 2.5 Vdd, 2.75 Vdd, . . . , and the −0.25 Vdd step boosting charge-pump circuit 50 outputs a boosted voltage of −0.5 Vdd, −Vdd, −1.5 Vdd, −1.75 Vdd, −2 Vdd, −2.25 Vdd, −2.5 Vdd, −2.75 Vdd, . . . These two charge-pump circuits 30 and 50 are operated separately, as will be described later, and a combination of these circuits can constitute a positive voltage or negative voltage power source.

The +0.25 Vdd step charge-pump circuit will now be described. Diodes D1 to Dn+1 are connected in series, and a power voltage Vdd is applied to the anode of the diode D1 at the first stage. Two series-parallel capacitors 33 (C1) are connected to the juncture of the diodes D1 and D2, and capacitors C2, C3, . . . are connected to the junctures of the diodes D2 to Dn+1, while a load 32 is connected to the output terminal of the diode Dn+1.

A clock driver 31*a* supplies a clock CLK to the series-parallel capacitors 33, and a clock driver 31*b* supplies a clock CLK to the capacitors C2 and C3. The phases of the clocks CLK of the clock drivers 31*a* and 31*b* are reversed, and a switch S10 is used to supply either 1.25 Vdd or Vdd as the power voltage of the clock driver 31*a*.

Further, as in the second embodiment, the detector, the charge-pump circuit step count controller and the regulator can be provided as needed.

The −0.25 Vdd step boosting charge-pump circuit 50 will now be explained. Diodes D'1 to D'n+1 are connected in series, and a ground voltage (0V) is supplied to the anode of the diode D'1 at the first stage. Two series-parallel capacitors 53 (C'1) are connected to the juncture of the diodes D'1 and D'2, capacitors C'2 and C'3 are connected to the junctures of the diodes D'2 to D'n+1, and a load 52 is connected to the output terminal of the diode D'n+1.

A clock driver 51*a* supplies a clock CK to the series-parallel capacitors 53, a clock driver 51*b* supplies a clock CK to the capacitor C'2, and a clock driver 51*c* supplies a clock CK to the capacitors C'3 . . . The phases of the clock driver 51*a* and the clock drivers 51*b* and 51*c* are reversed, and a switch S11 is used to select 1.25 Vdd or Vdd as the power voltage for the clock driver 51*b*. Furthermore, as in the second embodiment, the detector, the charge-pump circuit step count controller and the regulator can be provided, as needed.

The operation of the +0.25 Vdd step boosting charge-pump circuit 30 will now be described. For a pump node voltage VH1 at the first step, assume that the switch s10 is changed to the Vdd side, and the voltage Vdd is supplied as the power voltage for the clock driver 31*a*. Then, as was explained in the first embodiment, when the series-parallel capacitors 33 are operated while their connection is changed to a series connection or to a parallel connection, the pump node voltage VH1 is Vdd+½Vdd=1.5 Vdd, and when the series-parallel capacitors 33 are operated while continuously connected in series, the pump node voltage VH1 is Vdd+Vdd=2 Vdd.

On the other hand, assume that the switch S10 is changed to the 1.25 Vdd side, and the voltage 1.25 Vdd is supplied as the power voltage for the clock driver 31*a*. Then, when the series-parallel capacitors 33 are operated while their connection is changed to a series connection or to a parallel connection, the pump node VH1 is 1.25 vdd+½Vdd=1.75 Vdd, and when the series-parallel capacitors are operated while they are continuously connected in series, the pump node voltage VH1 is 1.25 Vdd+Vdd=2.25 Vdd.

That is, the pump node voltage VH1 of 1.5 Vdd, 1.75 Vdd, 2 Vdd or 2.25 Vdd can be obtained in accordance with the state of the switch S10 and the connection of the serial-parallel capacitors 33. Therefore, since at the second stage Vdd is added to the pump node voltage VH1 as the pump node voltage VH2, 2.5 Vdd, 2.75 Vdd, 3 Vdd or 3.25 Vdd can be obtained. Therefore, by controlling the number n of the charge pump steps at the following stages, an arbitrary boosted voltage can be obtained at a 0.25 Vdd step.

The same operation is performed by the −0.25 Vdd step boosting charge-pump circuit 50, except that the power voltage of the clock driver 51*b* connected to the capacitor C2 at the second stage is changed by the switch S11. This occurs because when the power voltage of the clock driver 51*a* at the first stage is to be changed, the power voltage is reduced to ½, so that the 0.25 Vdd voltage step can not be obtained.

With this arrangement, consonant with the changing of the connections of the series-parallel capacitors 53, 0.5 Vdd or Vdd is obtained as the pump node voltage VH'1 at the first stage, and consonant with the changing of the switch S11, −1.5 Vdd, −1.75 Vdd, −2 Vdd or −2.25 Vdd is obtained. Since at the following stages the number of charge pump steps is controlled in this manner, an arbitrary boosted voltage can be obtained at a −0.25 Vdd step.

Further, also included the aspects of the invention is that, in the charge-pump circuit in this embodiment, a boosted voltage can be obtained for an arbitrary step by changing the number of the series-parallel capacitors 33, 42 and 53. The series-parallel capacitors 33, 42 and 53 may be constituted by switches that correspond to three capacitors, so that a 0.33 Vdd step charge-pump circuit can be obtained. That is, the boosted voltage in this case is 1.33 Vdd, 1.66 Vdd, 2 Vdd, 2.33 Vdd, 2.66 Vdd, 3 Vdd, . . . 1.66 Vdd, −2 Vdd, −2.33 Vdd, −2.66 Vdd, −3 Vdd, . . .

The following effects are obtained by the embodiments of the present invention.

First, since the series or parallel connection of capacitors is selected consonant with the level of a clock, a voltage step by which the voltage can be boosted is smaller than the power voltage Vdd, especially when a positive or negative boosted voltage is obtained, and further, the efficiency ratio η of C3 10 the circuit can be improved.

Second, since the n-step charge-pump circuit is also employed, a positive or negative boosted voltage can be output at a step obtained by adding the voltage step of the power voltage Vdd to a voltage step smaller than the power voltage. While at the same time, the efficiency ratio η of the circuit can be improved.

Third, since the regulator, the voltage detector and the clock control means are provided, the number of steps in the charge-pump circuit can be changed in accordance with the boosted voltage, and the boosted voltage adjusted. In this manner, the efficiency ratio η of the circuit can be even further enhanced.

What is claimed is:

1. A charge-pump circuit comprising:
   a plurality of diodes connected in series;
   at least two capacitors connected in series or in parallel, said capacitors branching off from a line connecting two adjacent diodes among the plurality of diodes in series;

clock supply means connected to said capacitors at an end away from the diodes; and switching means for connecting said capacitors in series or in parallel between the line and the clock supply means in accordance with a voltage level of said clock, wherein a boosted voltage is output by said diodes.

2. A charge-pump circuit comprising:

a plurality of diodes connected in series;

a power source coupled to the plurality of diodes at one end;

at least two capacitors connected in parallel or series, said capacitors branching off from a line connecting two adjacent diodes among the plurality of diodes connected in series;

clock supply means connected to said capacitors at an end away from the diodes; and switching means coupled to said capacitors disposed between the line, and the clock supply means to connect said capacitors in series when said clock is at a low level or in parallel when said clock is at a high level, wherein a positive, boosted voltage is output by the plurality of diodes connected in series at an end opposite to the end coupled to the power source.

3. A charge-pump circuit comprising:

a plurality of diodes connected in series;

a power source coupled to the plurality of diodes at one end;

at least two, first capacitors connected in series or in parallel, said first capacitors branching off from a line connecting two adjacent diodes among the plurality of diodes connected in series;

at least one, second capacitor connected to a line connecting other diodes among the plurality of diodes connected in series;

clock supply means for alternately supplying clocks in reverse phases to said first capacitors and said second capacitor, said clock supply means connected to said first capacitors and second capacitor, respectively, at a side away from the diodes; and switching means coupled to said first capacitors disposed between the line and the clock supply means to connect the first capacitors in series when said clock supplied to said first capacitor is at a low level and in parallel when said clock supplied to said first capacitors is at a high level, in accordance with the voltage level of said clock supplied to said first capacitors, and wherein a positive, boosted voltage is output by the plurality of diodes connected in series at an end opposite to the end coupled to the power source.

4. A charge-pump circuit comprising:

a plurality of diodes being connected in series, with a ground coupled to one end of the plurality of diodes connected in series;

at least two capacitors connected in series or in parallel, said capacitors coupled to a line connecting two adjacent diodes among the plurality of diodes connected in series;

clock driver means connected to said capacitors at a side opposite to the line; and switching means coupled to said capacitors disposed between the line and the clock supply means to connect said capacitors in series when said clock is at a high level and in parallel when said clock is at a low level, wherein a negative, boosted voltage is output by the plurality of diodes connected in series at an end opposite to the end coupled to the ground.

5. A charge-pump circuit comprising:

a plurality of diodes being connected in series, with a ground coupled to one end of the plurality of diodes connected in series;

at least two, first capacitors connected in series or in parallel to a line connecting two adjacent diodes among the plurality of diodes connected in series;

at least one, second capacitor connected to a line connecting other diodes among the plurality of diodes connected in series;

clock supply means for alternately supplying clocks in reverse phases to said first capacitors and said second capacitor, said clock supply means connected to said first capacitors and second capacitor, respectively, at a side opposite to the lines; and switching means coupled to said capacitors disposed between the line and the clock supply means to change the connections of said first capacitors to series or parallel in accordance with the voltage level of said clock supplied to said first capacitors, wherein a negative, boosted voltage is output by the plurality of diodes connected in series at an end opposite to the end coupled to the ground.

6. A charge-pump circuit according to claim 2, 3, 4, or 5, further comprising:

switch control means for controlling said switching means in response to a switch control signal output by said switch control means, said two or more capacitors are always connected in series, or are connected in series or in parallel in accordance with the level of said clock.

7. A charge-pump circuit according to claim 2, 3, 4, or 5 further comprising:

a regulator for adjusting the boosted voltage output by the plurality of diodes connected in series.

8. A charge-pump circuit according to claim 3, 4, or 5, further comprising:

voltage detection means for detecting said boosted voltage output; and charge-pump circuit step count means for controlling the number of steps in said charge-pump circuit in accordance with voltages detected by the voltage detection means.

9. A charge-pump circuit according to one of claims 1 to 5, wherein said diodes comprise a MOS transistor of which a gate and a source are connected in common.

10. A charge-pump circuit according to one of claims 1 to 5, wherein said switching means comprises a MOS transistor.

* * * * *